US012654955B2

(12) United States Patent
Gonni et al.

(10) Patent No.: US 12,654,955 B2
(45) Date of Patent: Jun. 16, 2026

(54) HANDLING METHOD AND MACHINE TO RE-ARRANGE CERAMIC ARTICLES OF A GROUP OF CERAMIC ARTICLES

(71) Applicant: Sacmi Cooperativa Meccanici Imola Societa' Cooperativa, Imola (IT)

(72) Inventors: Paolo Gonni, Imola (IT); Filippo Marchetti, Imola (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 829 days.

(21) Appl. No.: 18/004,863

(22) PCT Filed: Jul. 9, 2021

(86) PCT No.: PCT/IB2021/056191

§ 371 (c)(1),
(2) Date: Jan. 9, 2023

(87) PCT Pub. No.: WO2022/009172

PCT Pub. Date: Jan. 13, 2022

(65) Prior Publication Data

US 2023/0348208 A1     Nov. 2, 2023

(30) Foreign Application Priority Data

Jul. 10, 2020     (IT) ........................ 102020000016837

(51) Int. Cl.
*B65G 49/08*     (2006.01)
*B65G 47/90*     (2006.01)
*B65G 61/00*     (2006.01)

(52) U.S. Cl.
CPC ............. *B65G 49/08* (2013.01); *B65G 47/90* (2013.01); *B65G 61/00* (2013.01)

(58) Field of Classification Search
CPC ......... B65G 47/90; B65G 49/08; B65G 61/00
See application file for complete search history.

(56) References Cited

U.S. PATENT DOCUMENTS

2009/0279999 A1     11/2009     Faulkner
2009/0299521 A1     12/2009     Hansl et al.
2012/0245728 A1      9/2012     Koholka

FOREIGN PATENT DOCUMENTS

CN        110654879 A     1/2020
DE        4407392        9/1995
DE        10356563       6/2005

(Continued)

OTHER PUBLICATIONS

Office Action received for Russian Patent Application No. 2023101197, mailed on Aug. 10, 2023, 7 pages.

(Continued)

*Primary Examiner* — Daniel Jeremy Leeds
(74) *Attorney, Agent, or Firm* — Workman Nydegger

(57)     ABSTRACT

Handling method and machine to re-arrange ceramic articles; the handling machine comprises: a first moving device to pick up and move at least part of the ceramic articles from a first support structure to a splitting-up station; a support comprising a base portion, a plurality of projections and a plurality of recesses; and a second moving device to transfer such ceramic articles from the splitting-up station to an output station and place them on a second support structure according to a second given arrangement so as to obtain a modified group of ceramic articles.

17 Claims, 15 Drawing Sheets

(56)  References Cited

FOREIGN PATENT DOCUMENTS

| | | |
|---|---|---|
| DE | 102013003768 | 8/2014 |
| EP | 3248915 | 11/2017 |
| EP | 3318371 | 5/2018 |
| GB | 0781263 A | 8/1957 |
| JP | 6661208 B1 | 3/2020 |
| SU | 710807 A1 | 2/1980 |

OTHER PUBLICATIONS

International Preliminary Report on Patentability received for PCT Patent Application No. PCT/IB21/056191, mailed on Jan. 19, 2023, 8 pages.
International Search Report and Written Opinion for PCT/IB2021-056191 mailed Oct. 26, 2021.
Office Action received for Chinese Patent Application No. 202180054970.8, mailed on Jan. 16, 2026, 12 pages (6 pages of English Translation and 6 pages of Original Document).

HANDLING METHOD AND MACHINE TO RE-ARRANGE CERAMIC ARTICLES OF A GROUP OF CERAMIC ARTICLES

CROSS-REFERENCE TO RELATED APPLICATIONS

This patent application is a 35 U.S.C. § 371 U.S. National Stage of PCT/IB2021/056191 filed Jul. 9, 2021, which claims priority from Italian patent application no. 102020000016837 filed on Oct. 7, 2020. The entire disclosure of each of the aforementioned patent applications is incorporated herein by reference.

TECHNICAL FIELD

The present invention relates to a handling method and machine to re-arrange ceramic articles of a group of ceramic articles (typically tiles or packages containing tiles).

BACKGROUND OF THE INVENTION

In the field of the ceramic processing industry, the ceramic articles leaving the production lines are grouped for forming respective groups of ceramic articles which are generally arranged vertically (i.e. edgeways) on support structures, for example on pallets, so as to occupy as little space as possible in order to obtain storage units which are stored in suitable gathering areas, from where such storage units are picked up when an order of ceramic articles to be shipped has to be formed.

Specifically, whenever an order of ceramic articles to be shipped has to be formed, one or more storage units are picked up from the gathering area and transported towards an area for opening and sorting the storage units (also called "picking bay"), where an operator manually or with the help of appropriate equipment (for example a zero balancer) picks up from each storage unit the number of ceramic articles that has to be shipped and manually arranges such ceramic articles on another support structure, for example on a further pallet, in a container, or on a stand, or on a plank etc., so as to obtain a shipping unit.

However, it is apparent that such procedures are relatively long, inefficient and risky for the ceramic articles (which can be damaged). Furthermore, they are particularly difficult and fatiguing for the operators given the usually heavy weight of the ceramic articles (and of the boxes thereof).

Another system for re-arranging ceramic articles of known type is the one described in the document EP3248915A1, which provides for feeding ceramic articles of different shapes on a suitable transport line, from which such articles are then picked up, by means of a robot with suction cups, and sorted on trolleys each intended to contain ceramic articles of a given shape. Such system requires long procedures, complex systems, and is risky for the ceramic articles that can bend and/or be damaged upon the picking up and/or during the transportation from the transport line to the respective trolley.

In trying to find a remedy for such drawbacks and in order to develop more efficient procedures for the forming of the shipping units, systems have been developed which provide for the picking up of the articles to be shipped from the storage units by means of robots provided with lifting clamps having a horizontal hold for the transfer of the ceramic articles.

Such lifting clamps laterally clamp the ceramic articles, typically entering into contact with the edges of the ceramic articles. To this regard, it should be noted that it is unadvisable to exert a pressure directly on the faces of the tiles, since there is the high risk that, by so doing, it is possible to cause the breaking of the tiles. Furthermore, the lifting clamps having a horizontal hold, have the drawback of needing sufficient free space around the articles to be picked up in order to act correctly. This does not allow grabbing all the ceramic articles from the storage structure (where the articles are grouped and arranged close to one another and/or in contact) in a simple manner and/or without the risk of damaging them.

A remedy for such problems has been proposed in patent application Ser. No. 10/201,9000007851, 102020000010729 and 102019000015380 which provide for the insertion of a grooved support between the different layers of ceramic articles of the group of ceramic articles of a storage structure and the use of a holding device with tines capable of being inserted in the grooves of the grooved support under each layer of ceramic articles for lifting at least one ceramic article so as to allow the picking up of the various ceramic articles of the group of ceramic articles layer by layer. However, this solution also has some drawbacks, among which include the following. The arrangement of the grooved support between the various layers of ceramic articles occurs by means of insertion devices which do not offer high placing precision of the grooved support, which besides could be subjected to movements and/or deformations also after being inserted between the different layers of the group of ceramic articles. This makes it impossible to know with precision the position of the grooves and thus the position in which to insert the tines of the holding device at the moment of the picking up of the ceramic article, if not through prior detection of the exact position of the grooved support, which entails a complication in the picking-up operations of each ceramic article and an increase in the time necessary for such picking up. Furthermore, the detection of the exact position of the grooved support is not always possible (since once inserted between the ceramic articles, the grooved support is totally surrounded by the ceramic articles) and also when it can be carried out it requires the installation of suitable detection devices, with clear economic drawbacks.

Similar problems are evident also in the palleting system for cardboard sheets described in the document DE10356563.

The object of the present invention is to provide a handling method and machine for re-arranging ceramic articles of a group of ceramic articles, which allow overcoming, at least partially, the drawbacks of the prior art and are, simultaneously, easy and cost-effective to embody.

SUMMARY

In accordance with the present invention, a handling method and machine are proposed for re-arranging ceramic articles of a group of ceramic articles, according to what disclosed in the appended independent claims, and preferably, in any one of the claims directly or indirectly dependent on the mentioned independent claims.

The claims describe preferred embodiments of the present invention forming integral part of the present description.

BRIEF DESCRIPTION OF THE DRAWINGS

The invention is described in the following with reference to the accompanying drawings, which illustrate some non-limiting example embodiments thereof, wherein.

Figure 1:
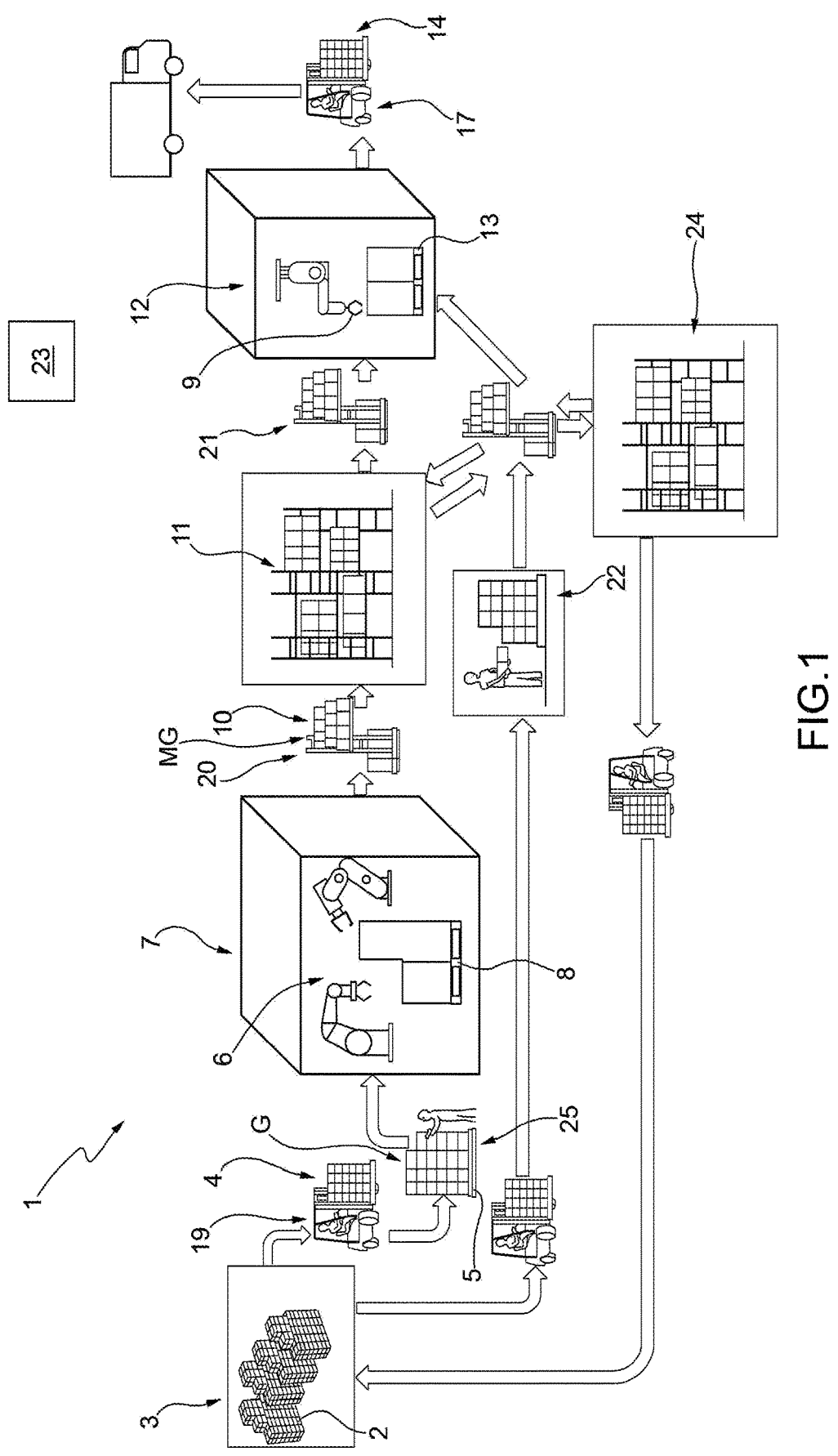
FIG. 1 is a schematic view of a plant for handling ceramic articles.
Figure 14:
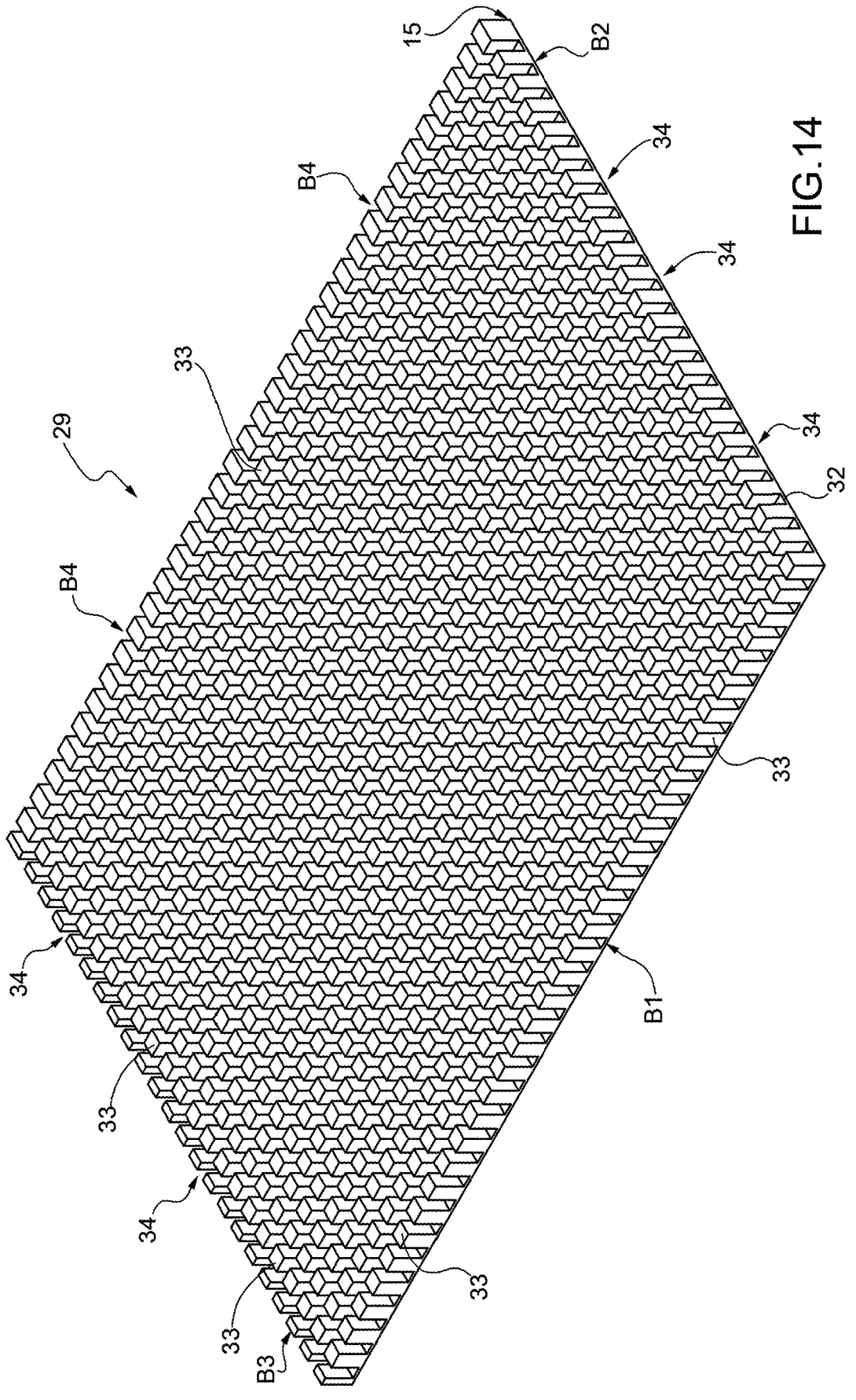
Figure 15:
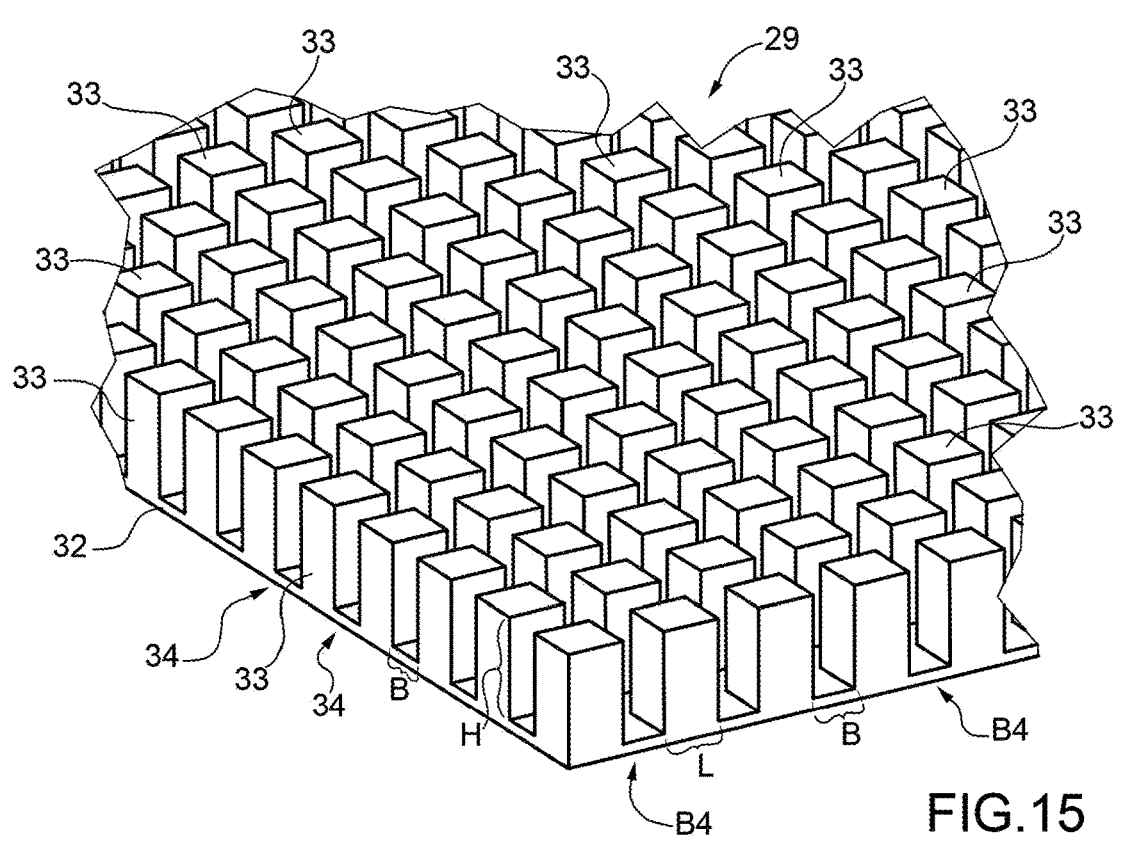
Figure 16:
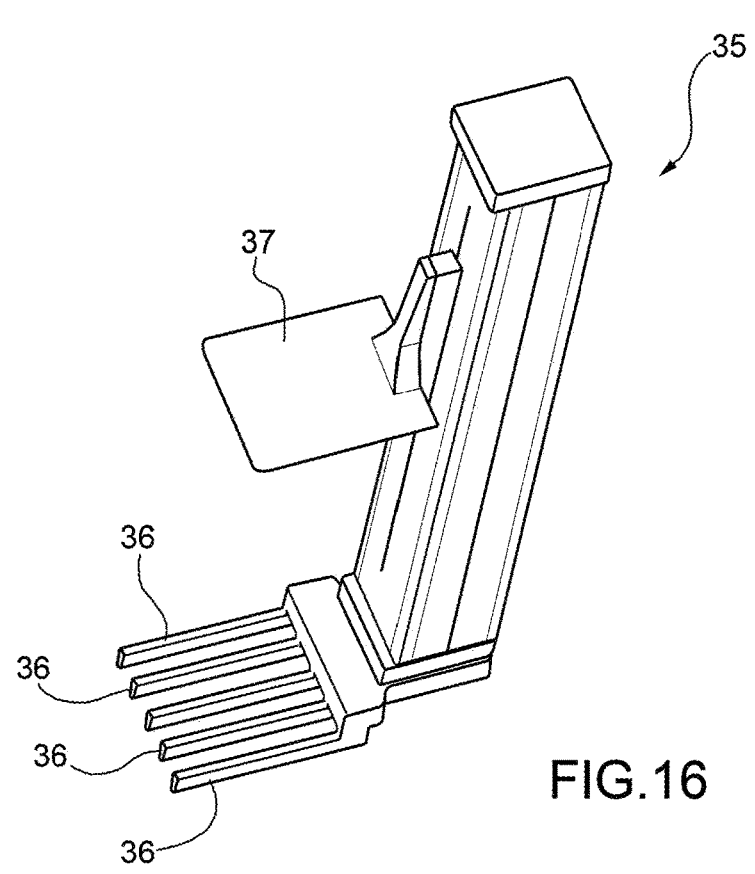

FIGS. from 3 to 13 are perspective views of a handling machine which is part of the plant of FIG. 1, manufactured in accordance with a first embodiment of the invention, during subsequent steps of the re-arranging process of the ceramic articles;

FIG. 14 is a perspective view, on an enlarged scale, of a support which is part of the handling machine of Figures from 3 to 13;

FIG. 15 illustrates, on an enlarged scale, a part of the support of FIG. 14; and FIG. 16 is a perspective view, on an enlarged scale, of a holding head of a moving device which is part of the handling machine of Figures from 3 to 13.

DETAILED DESCRIPTION

In FIG. 1, reference numeral 1 indicates, as a whole, a plant for handling ceramic articles 2.

In the present description, the expression "ceramic article 2" means one single ceramic product, for example one single ceramic sheet or a tile, or a box of ceramic products of the same type, or a bundle of boxes of ceramic products, or a plurality of ceramic products of the same type bound together for example by means of one or more straps or by means of packing wrap.

The plant 1 for handling ceramic articles 2 comprises: a gathering area 3, for example as illustrated in the accompanying figures a gathering yard, said gathering area 3 comprising a plurality of storage units 4, each comprising a group G of ceramic articles 2, which, in turn, comprises (in some non-limiting cases, consists of) a support structure 5 (for example a pallet) and a plurality of ceramic articles 2 placed on the support structure 5 according to a first given arrangement; and a handling machine 6, arranged at a re-arranging station 7, and configured to re-arrange at least part of the ceramic articles 2 (in particular all the ceramic articles 2) of the group G of ceramic articles 2 (of at least part, in particular of each storage unit 4) so as to obtain a modified group MG of ceramic articles 2 which comprises at least one sub-group SG of the aforementioned plurality of ceramic articles 2 of the group G and a support structure 8 (for example a pallet), on which (support structure 8) the ceramic articles 2 (of such sub-group SG) are arranged with a second given arrangement, different from the first given arrangement, so as to create at least one storage unit 10 (in particular, a plurality of storage units 10).

Figure 13:
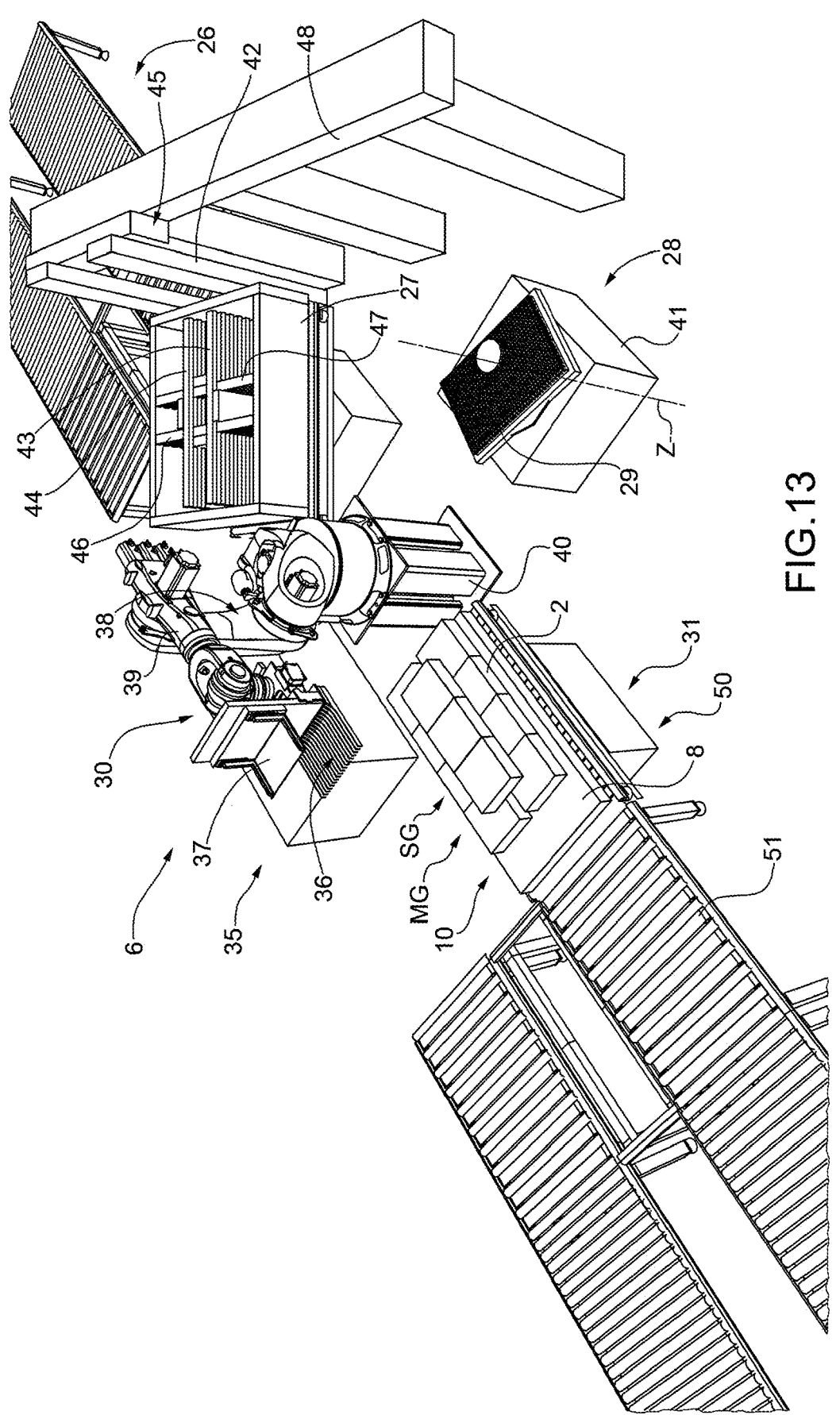

Specifically, advantageously, in the storage unit 10 the ceramic articles 2 are placed in such a way that they can be picked up by a holding device 9. In particular, advantageously but not necessarily, in such second given arrangement the ceramic articles 2 of the sub-group SG are arranged horizontally on the support structure 8 (see for example FIG. 13), so as to be stable on such support structure 8 (in particular, without the help of straps or other locking elements which fasten them to one another and/or to the respective support structure 8) and so that they can be grabbed laterally by the holding device 9, in particular by a holding device 9 with a horizontal hold. Alternatively or in combination, according to some advantageous but non-limiting embodiments, in the second given arrangement at least part of the ceramic articles 2 of the sub-group SG are arranged vertically on the support structure 8 and are shaped so as to be stable on such support structure 8 (in particular, without the help of straps or other locking elements that fasten them to one another and/or to the respective support structure 8) and so that they can be grabbed by the holding device 9. Specifically, such latter arrangement is particularly advantageous when the ceramic articles 2 of the aforementioned at least part of the ceramic articles 2 of the sub-group SG has a cubic shape (in particular, when each ceramic article 2 of the aforementioned at least part of the ceramic articles 2 of the sub-group SG comprises—more in particular consists of—a box of ceramic products, or a bundle of boxes of ceramic products, having a cubic shape. In other words, in the second given arrangement the ceramic articles 2 are reciprocally arranged so that each has at least two free lateral surfaces LS (see FIG. 2), so as to be grabbed by a holding device 9 with a horizontal hold, for example by a lifting clamp, independently of the others.

Figure 3:
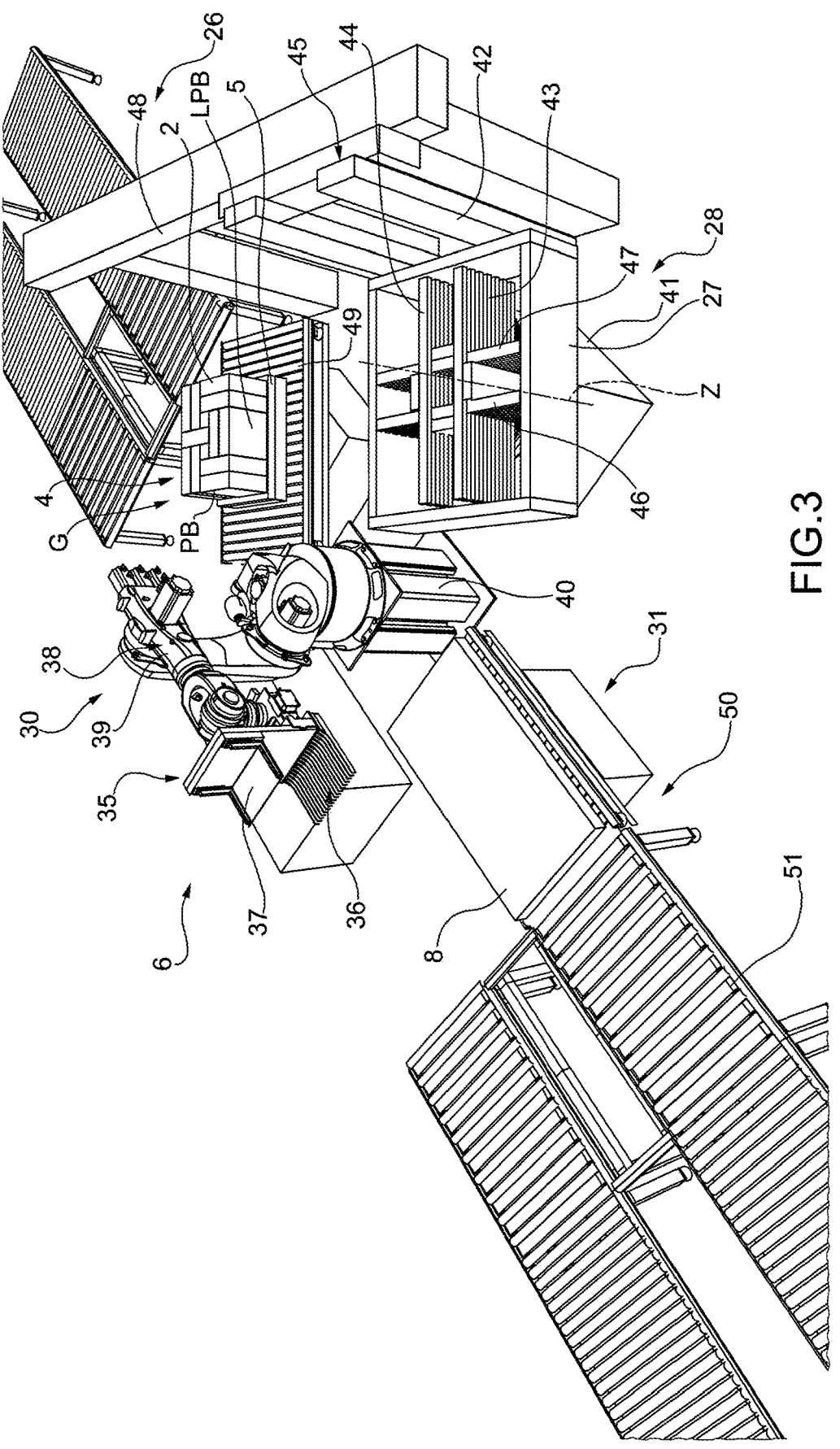
Figure 4:
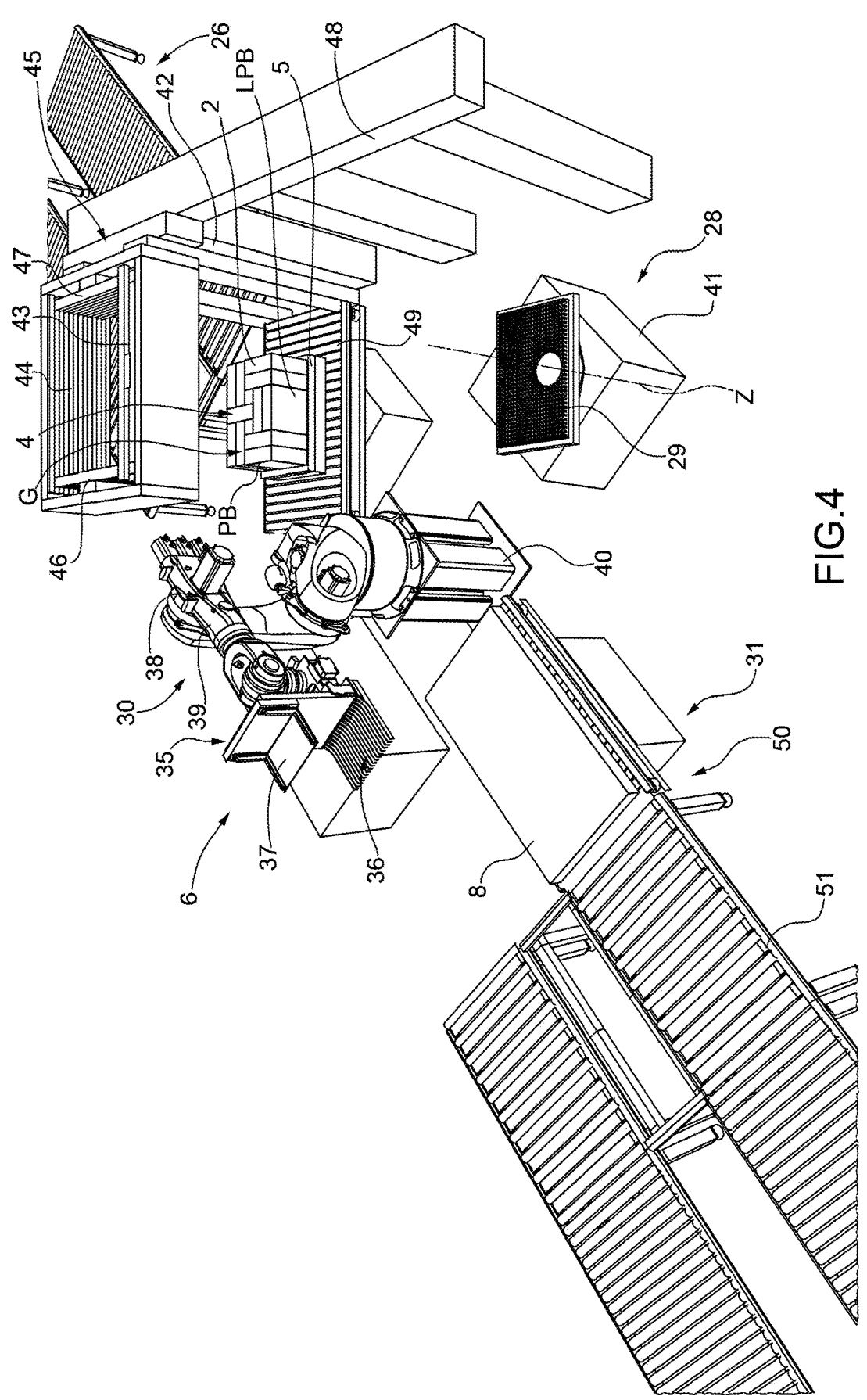
Figure 5:
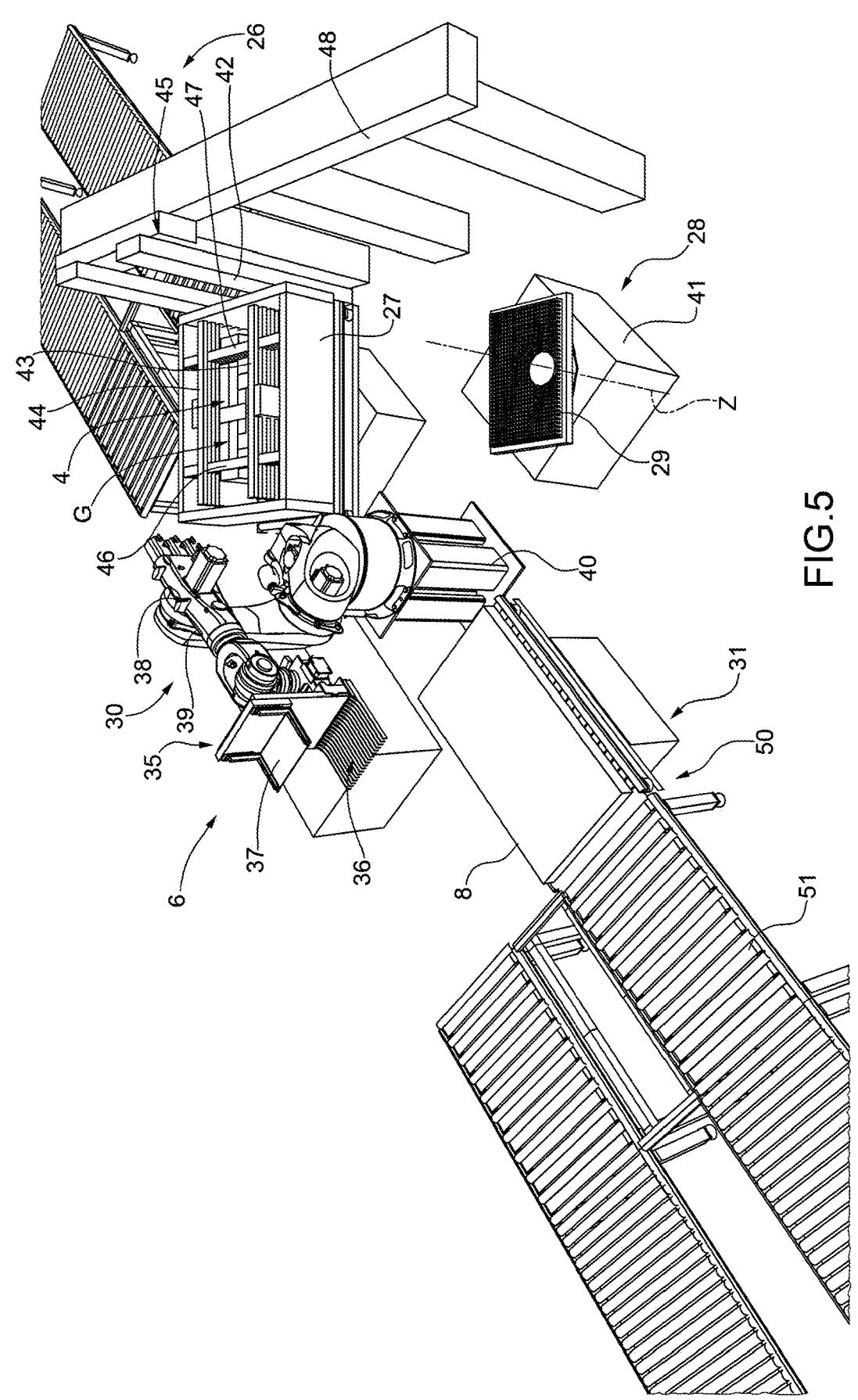
Figure 6:
Figure 7:
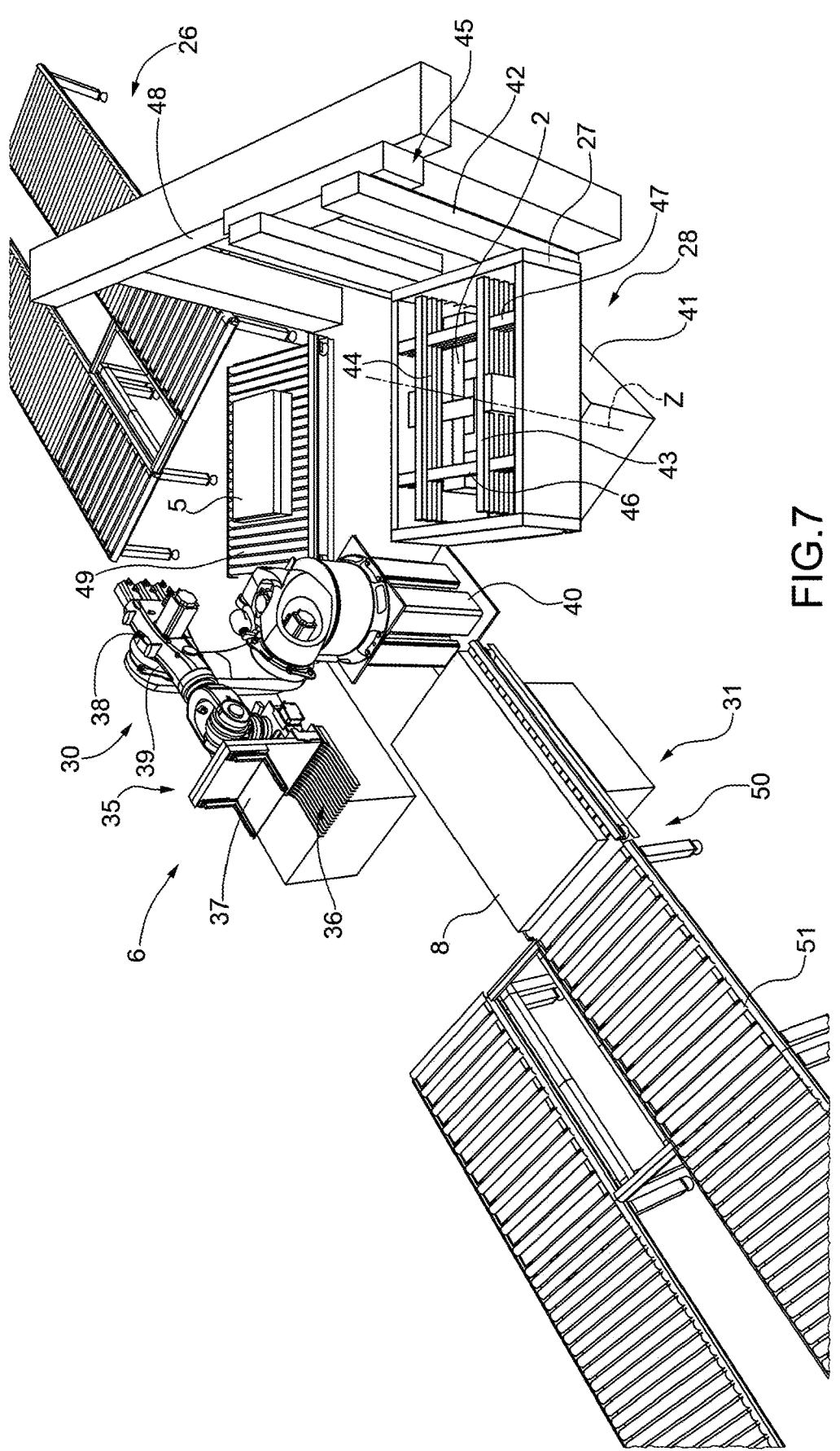
Figure 8:
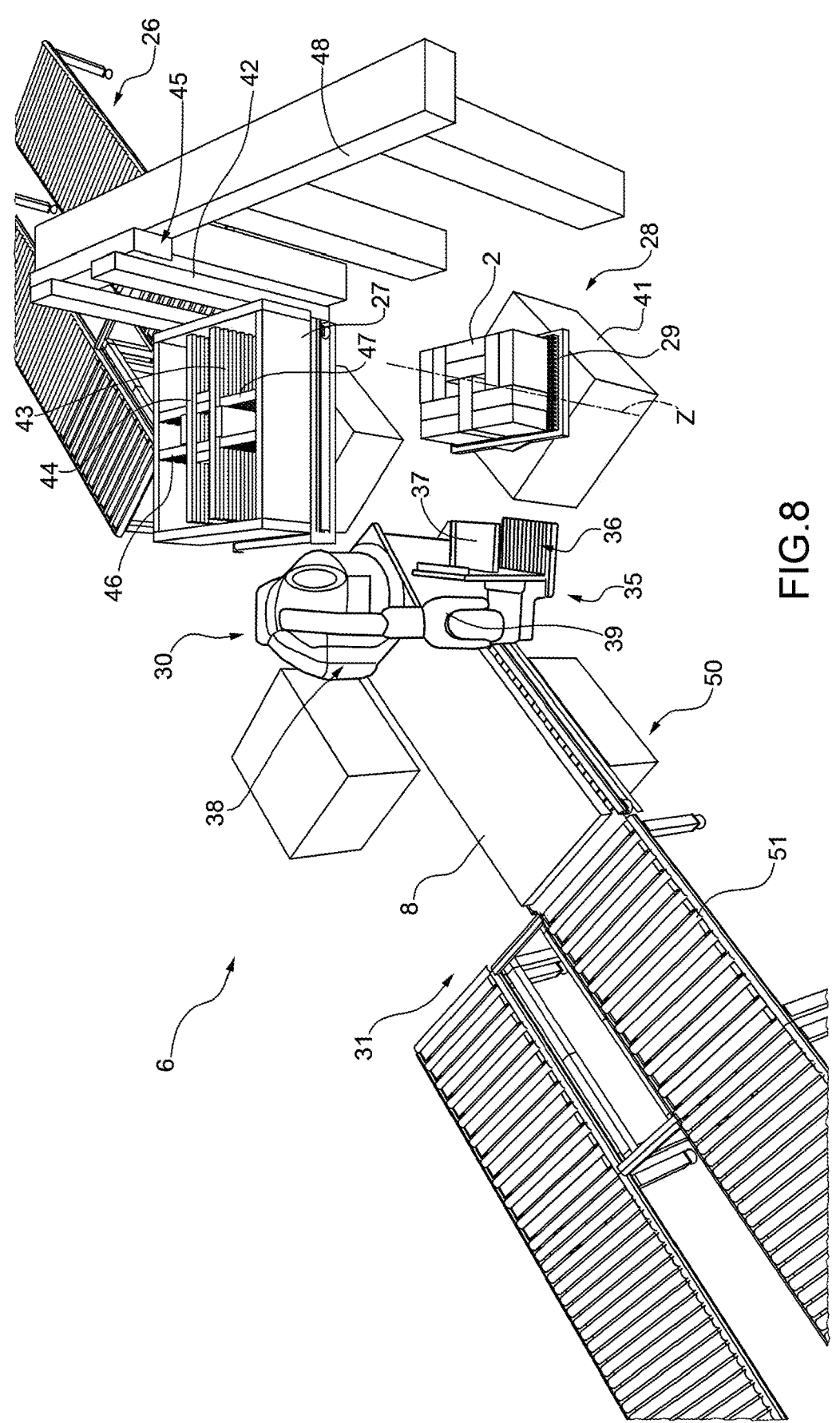
Figure 9:
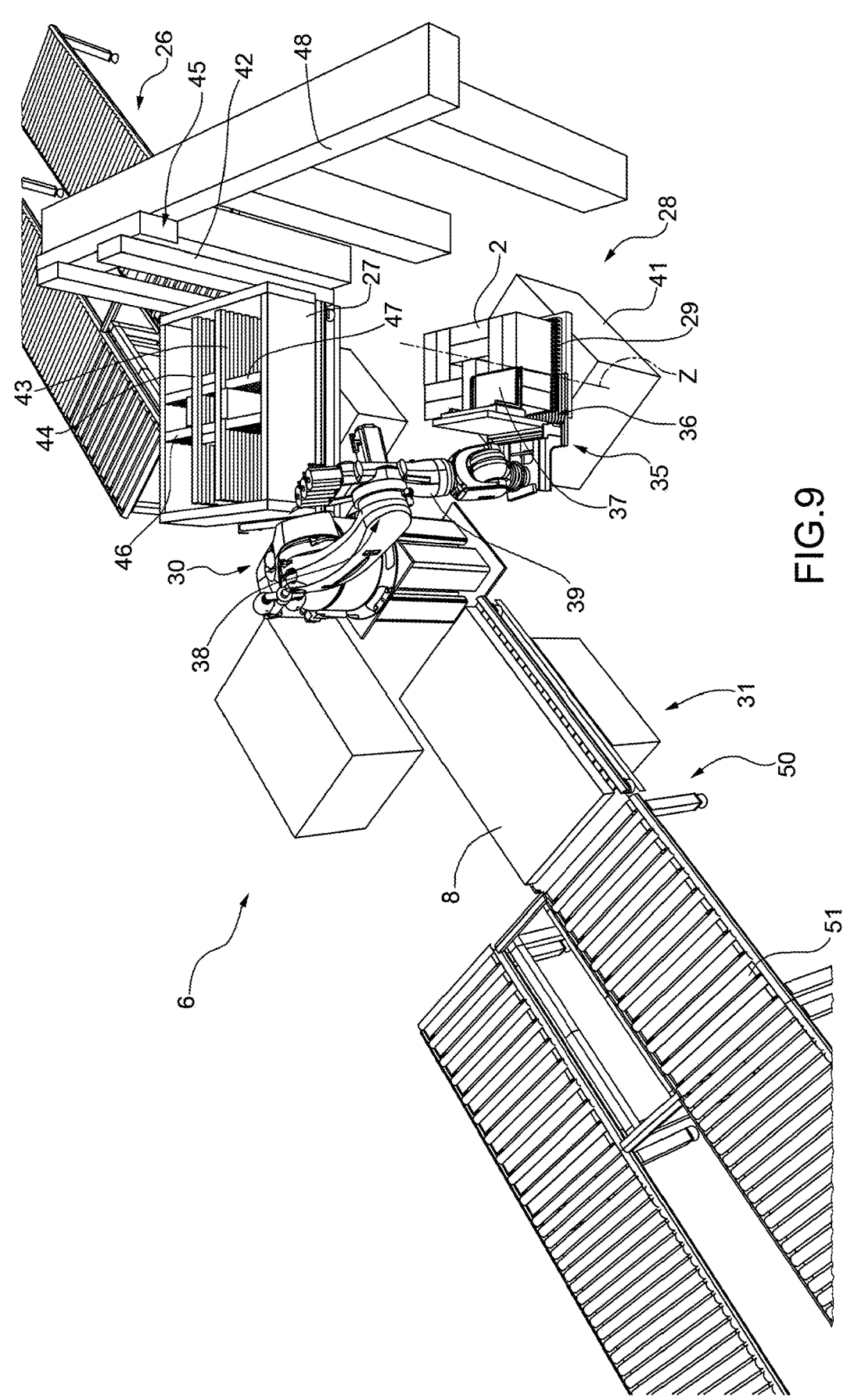
Figure 10:
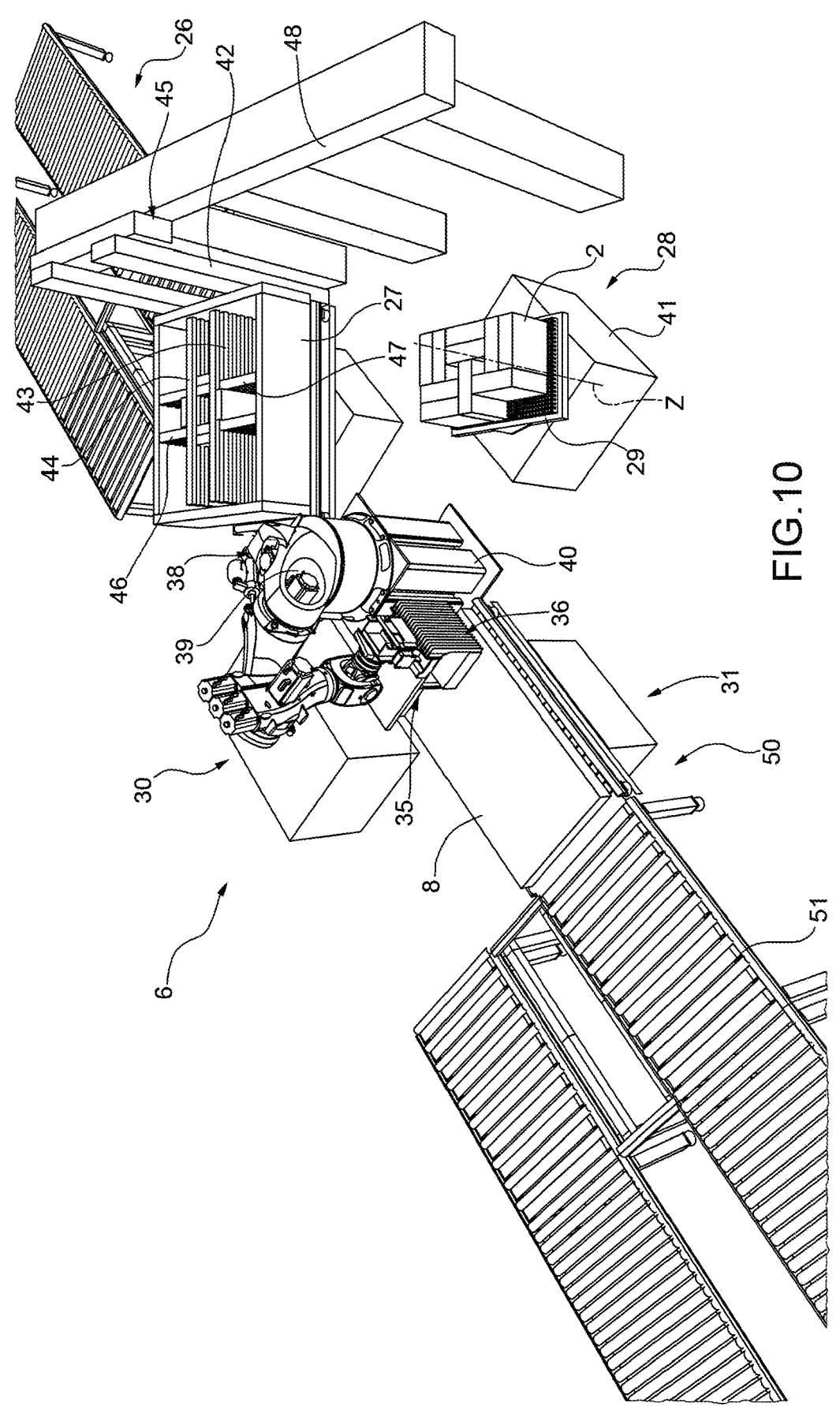

Advantageously but not necessarily, the first given arrangement is, instead, such that the ceramic articles 2 of the group G occupy as little space as possible, for example advantageously but not necessarily, the ceramic articles 2 are arranged in the group G (in particular on the support structure 4) so that at least one lateral portion, in particular at least one side of the peripheral edge PB of a (in particular, of each) ceramic article 2 is (completely) covered (and thus is not accessible, for example, by the jaw of a lifting clamp) by another ceramic article 2, or by other ceramic articles 2, of the group G. Still more in particular, advantageously but not limitedly, in the first given arrangement the ceramic articles 2 are arranged vertically (in particular, edgeways— see for example FIGS. 3 and 4) on the support structure 5, possibly stacked on top of one another and/or bound to one another and to the support structure 5, for example by means of a plurality of straps and/or by means of a packing film.

Advantageously, the plant 1 (as illustrated in FIG. 1) comprises an intermediate store 11 configured to receive at least a part of the plurality of storage units 10 formed by the handling machine 6; and a forming machine 12 for forming an order to be shipped configured to transfer at least one ceramic article 2, in particular a given number of ceramic articles 2, from at least one storage unit 10 on a support structure 13 so as to obtain a shipping unit 14.

Specifically, according to some non-limiting embodiments (such as the one illustrated in FIG. 2), the forming machine 12 comprises: a conveyor device 15 for receiving and conveying the storage unit 10; a conveyor device 16 for receiving the support structure 13 and for conveying the shipping unit 14 towards an output 17; and a holding device 9, preferably with a horizontal hold, arranged and configured to pick up the ceramic article 2 from the storage unit 10 and carry the ceramic article 2 on the support structure 13.

It is understood that the holding device 9 could be a holding device 9 of any other type for example, when ceramic article 2 means a ceramic product, the holding device 9 could be a suction holding device 9 having, for example, a plurality of suction cups; or the holding device 9 could be a forked holding device 9 etc.

It is further understood that the second given arrangement can be any arrangement which allows such holding device 9 to pick up each ceramic article 2, preferably independently of the others.

Figure 2:
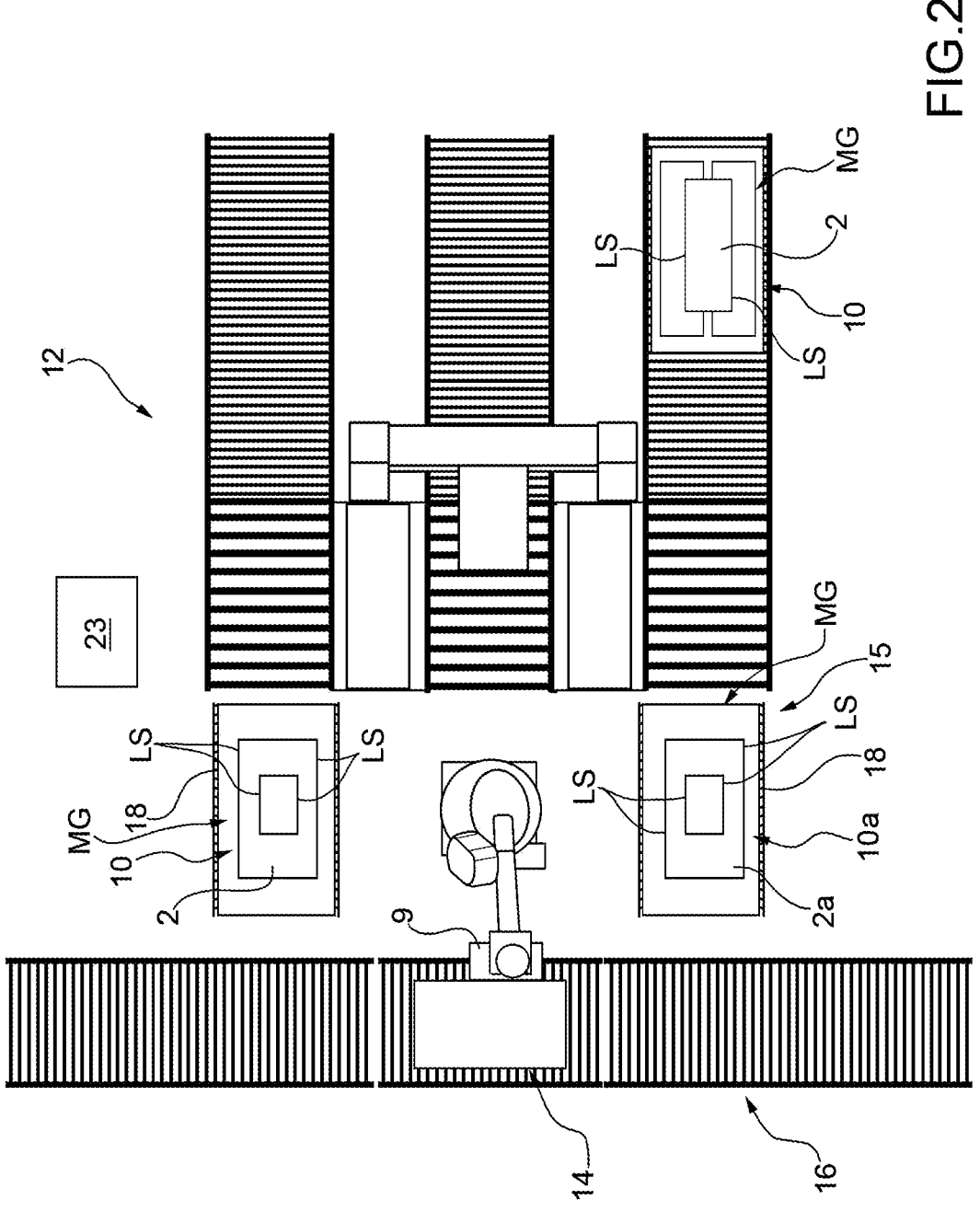
FIG. 2 is a plan view of a forming machine for forming an order to be shipped which is part of the plant of FIG. 1.

Advantageously but not necessarily (as illustrated in FIG. 2), the conveyor device 15 comprises (in particular, consists of) two conveyors 18 arranged facing one another and on the sides of the holding device 9 and each intended to receive a storage unit 10 from which, advantageously but not necessarily, the holding device 9 will be able to pick up ceramic articles 2 of different types for making up the shipping unit 14.

According to some advantageous but non-limiting embodiments not illustrated, the forming machine 12 further comprises a packing device (of known type and not further described herein) for packing the shipping unit 14 before the latter is conveyed towards the output 17.

Furthermore, advantageously but not limitedly (as illustrated in FIG. 1) the plant 1 also comprises: at least one transfer device 19 designed to pick up the storage unit 4 from the gathering area 3 and transfer the storage unit 4 towards the re-arranging station 7; a transfer device 20 for transferring the storage unit 10 created in the re-arranging station 7 towards the intermediate store 11; and a transfer device 21 for transferring the ceramic article 2 of the storage unit 10, in particular the given number of ceramic articles 2 of the storage unit 10, from the intermediate store 11 to the forming machine 12.

Still more specifically, advantageously but not necessarily, the transfer device 21 transfers the storage unit 10 from the intermediate store 11 to the forming machine 12, which (forming machine 12) is configured to transfer the ceramic article 2, in particular the given number of ceramic articles 2 intended to form the shipping unit 14, on a support structure 13 so as to obtain a shipping unit 14.

Advantageously but not limitedly, each of such transfer devices 19, 20 and 21 comprises (in particular, is) an automatically or manually driven holding vehicle, or a lift truck, or a fork lift, etc.

According to some embodiments such as the ones illustrated in the accompanying figures, the plant 1 also comprises a further gathering area 22 intended to receive the part of storage units 4 having a low frequency of use, i.e. the part of storage units 4 containing ceramic articles 2 which are requested with a low frequency for forming the orders to be shipped, thus shipping units 14.

Advantageously but not necessarily, the plant 1 also comprises a control unit 23 which is configured to control at least the forming machine 12 and comprises a schedule of the orders to be shipped, said schedule associating each order to be shipped with a composition of ceramic articles 2 to be shipped, in particular a type of ceramic articles 2 to be shipped and a number of ceramic articles 2 (of each type) to be shipped, and a shipping date, so as to manage to automate the handling of the ceramic articles 2.

According to some advantageous but non-limiting embodiments, the plant 1 also comprises an identification unit (not illustrated) arranged at the gathering area 3 and configured to identify each storage unit 4 picked up from the gathering area 3 and to transfer the data to the control unit 23, so that, depending on what detected by the identification unit and on what is contained in the schedule, the storage units 4 are sorted between the re-arranging station 7 and the further gathering area 22.

According to some advantageous but non-limiting embodiments, the control unit 23 is configured to also control the transfer devices 19, 20 and 21, in particular when such transfer devices 19, 20 and 21 are automatic devices, for example automatically driven holding vehicles.

According to some non-limiting embodiments (such as the one illustrated in FIG. 1), the plant 1 comprises a further intermediate store 24 for receiving part of the storage units 10. In this case, advantageously but not necessarily, the transfer device 20 is configured to transport, in particular depending on the schedule of the orders to be shipped, some storage units 10 towards the intermediate store 11 and others towards the further intermediate store 24.

Specifically, advantageously but not limitedly, the intermediate store 11 is arranged and configured to contain the storage units 10 intended (based on the schedule) to be used for forming the shipping unit 14 in the days immediately following the creation thereof in the re-arranging station 7, i.e. the storage structures 10 also called "high rotation" storage structures 10 which contain ceramic articles 2 of types requested with a high frequency, which thus, based on the schedule of the orders to be processed, are intended to remain (stand) in the intermediate store 11 for brief periods, in the order of 1-2 days; while the further intermediate store 24 is arranged and configured to contain the storage units 10 intended to be used for forming the shipping unit 14, based on the schedule of the orders to be processed, only after a period of more than at least 2 days as of their creation in the re-arranging station 7, i.e. the storage structures 10 also called "low rotation" storage structures 10 which contain ceramic articles 2 of types requested with less frequency with respect to that with which the ceramic articles 2 arranged in the intermediate store 11 are requested, and thus the storage structures 10 intended to remain (stand) in the intermediate store 24 for a period of more than at least 2 days.

According to embodiments not illustrated, the intermediate store 11 and the further intermediate store 24 are different areas of a same intermediate store.

According to some embodiments (such as the ones illustrated in FIGS. from 3 to 13), the handling machine 6 comprises: an input station 26 in the area of which the transfer device 19 places the group G of ceramic articles 2 (in particular, the storage unit 4 described above); and a moving device 27 configured to pick up at least part of the plurality of ceramic articles 2 of the group G from the support structure 5 and move them from the input station 26 to a splitting-up station 28.

Specifically, advantageously but not limitedly, the aforementioned part of the plurality of ceramic articles 2 of the group G (which the moving device 27 is intended to pick up) has a peripheral edge PB and the moving device 27 is configured to surround in contact (in other words to clamp) at least part of such peripheral edge PB so as to hold the aforementioned part of the plurality of ceramic articles 2 and transfer it from the input station 26 to the splitting-up station 28.

Advantageously, the handling machine 6 further comprises: a support 29 which is arranged at the splitting-up station 28 and is configured to support the ceramic articles 2 picked up by the moving device 27; and a further moving device 30 which is configured to transfer the aforementioned sub-group SG of ceramic articles 2 from the splitting-up station 28 to an output station 31 and arrange such sub-group SG of ceramic articles 2 on the support structure 8, placed at the output station 31, arranged according to the second given arrangement so as to obtain the modified group MG of ceramic articles 2, as well as the aforementioned storage unit 10.

It is specified that, the sub-group SG of ceramic articles 2 is at least a portion of the aforementioned at least part of the plurality of ceramic articles 2 of the group G which is picked up by the moving device 27.

Specifically, advantageously (as illustrated in FIGS. 14 and 15), the support 29 comprises a base portion 32 and a plurality of projections 33, which project from the base portion 32 so as to define a plurality of recesses 34 each placed between the projections 33 (see, for example, FIGS.

14 and 15), in particular each delimited (at least partially) by the projections 33. Advantageously but not limitedly, such projections 33 are configured to support the ceramic articles 2.

Advantageously, the moving device 30 comprises a holding head 35, which in turn comprises at least two tines 36, in particular a plurality of tines 36 (see for example FIG. 16), and is configured to insert at least part of the tines 36 in corresponding first recesses 34 of the support 29 so as to pick up from such support 29 at least one ceramic article 2 of the aforementioned part of the plurality of ceramic articles 2 (transported by the moving device 27 on the support 29). In particular, advantageously but not limitedly, the moving device 30 (and more specifically the holding head 35) is configured to pick up each ceramic article 2 between those arranged on the support 29 independently of the others.

The presence and the shape of the support 29 and of the holding head 35 allow grabbing and moving the article(s) 2 from the support 29 in a simple and quick manner without having the interference of further ceramic articles 2 of the group G. In this manner it is thus possible to reduce the risk of damaging further ceramic articles 2 arranged on the support 29 during the holding operations of the ceramic article 2.

Advantageously but not limitedly, the support 29 and/or the moving device 30 are of the type described in patent application Ser. No. 10/201,9000007851, 102020000010729 and 102019000015380.

According to some non-limiting embodiments, each recess 34 extends (at least partially) between two rows directly side by side (i.e. without the interposition of further projections 33) of projections 33.

In particular, advantageously, the recesses 34 are substantially straight and even more advantageously they are substantially parallel to one another.

With particular reference to FIGS. 14 and 15, advantageously but not limitedly, the (in particular at least part of the) recesses 34 extend from an end edge B1 of the support 29 to a further end edge B4 of the support 29 which is opposite the end edge B1, in this manner, it is possible to access (in particular, the moving device 30, and still more in particular the holding head 35, can access) the recesses 34 from different parts (in particular opposite) of the support 29. Furthermore, advantageously but not necessarily, further recesses 34 extend from an end edge B2 of the support 29, orthogonal to the end edges B1 and B4, up to a further end edge B3 parallel to and opposite the edge B2 and orthogonal to the end edges B1 and B4, in this manner, it is possible to access (in particular, the moving device 30, and still more in particular the holding head 35, can access) the recesses 34 from another two different (in particular opposite) parts of the support 29.

According to some advantageous but non-limiting embodiments (such as the ones illustrated in Figures from 3 to 13 and in FIG. 16), the holding head 35 also comprises an opposing element 37 arranged opposite the tines 36 and is configured to clamp at least one ceramic article 2 between the tines 36 and the opposing element 37. In other words, the opposing element 37 and the tines 36 define a jaw with a horizontal hold (see in particular FIG. 16). Specifically, advantageously but not necessarily, the holding head 35 also comprises an actuator (of known type and not illustrated; for example, an electric actuator) for moving the tines 36 and/or the opposing element 37 relative to one another so as to clamp the ceramic article 2.

According to some advantageous but not exclusive embodiments of the present invention, the moving device 30 comprises a moving assembly 38, which carries the holding head 35 and is configured to move the holding head 35 at least between the splitting-up station 28 and the output station 31.

Figure 11:
Figure 12:
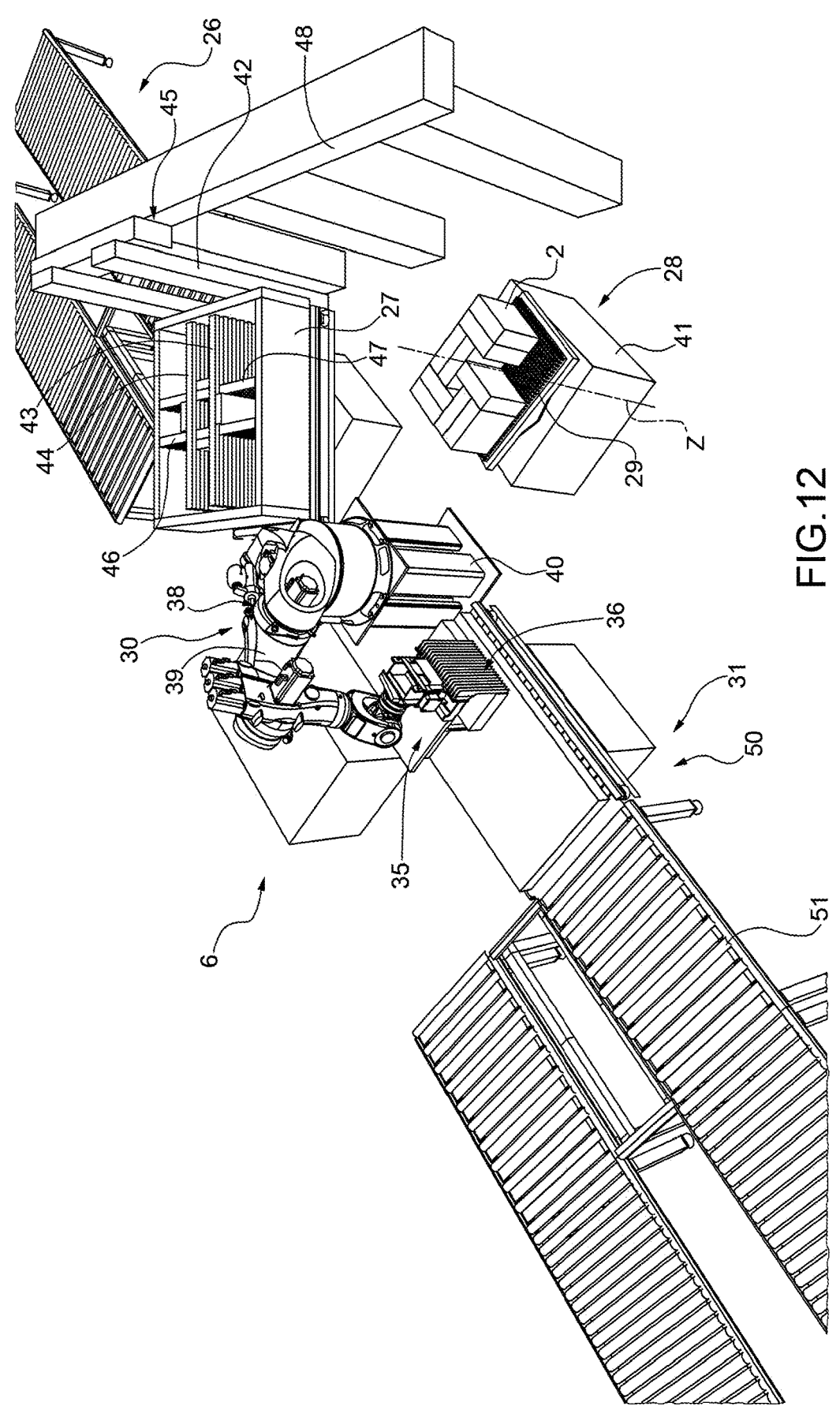

Advantageously but not necessarily, the holding head 35 can rotate relative to the moving assembly 38; in this manner, the holding head 35 can advantageously pick up the ceramic articles 2 from the support 29 which are oriented according to a first given orientation and arrange them (after rotating relative to the moving assembly 38) on the support structure 8 according to a second orientation, different from the first orientation. For example, in the advantageous but non-limiting embodiment illustrated in the accompanying figures (for example compare FIGS. 11 and 12), the holding head 35 picks up each ceramic article 2 from the support 29 oriented vertically (or edgeways) and places it oriented horizontally on the support structure 8.

Specifically, according to some advantageous but not exclusive embodiments such as the ones illustrated in Figures from 3 to 13, the moving assembly 38 comprises a robotic arm 39 on which said holding head 35 is mounted and an operating unit 40 for operating the robotic arm 39. In particular, advantageously the robotic arm 39 is connected at one end to the holding head 35 and at the opposite end to the operating unit 40, which is advantageously but not necessarily controlled by a control unit which can coincide with the control unit 23 described above or, according to variants not illustrated, it can be a further control unit forming part of the handling machine 6.

Advantageously but not limitedly, the robotic arm 39 comprises (in particular consists of) an anthropomorphic robot, a cartesian robot, a cylindrical robot, a spherical robot, a SCARA robot or an articulated robot.

According to further non-limiting embodiments not illustrated, the holding head 35 comprises a first group of base tines 36 and a second group of lifting tines 36 and an actuator (of known type and not illustrated) configured to move (lift) the lifting tines 36 relative to the base tines 36. In this case, in use, all of the tines 36 (both the base ones and the lifting ones) are all inserted in the recesses 34, but only the lifting tines 36 (moved by the mentioned actuator) lift moving the ceramic article 2 (or the ceramic articles 2) upwards from the support 29. In other words (in these cases), the moving device 30 moves the ceramic article 2 (or the ceramic articles 2) (only) vertically.

According to some non-limiting embodiments (such as the one illustrated in Figures from 3 to 13), in order to improve the accessibility of the moving device 30 (in particular of the holding head 35) to the support 29, said support 29 can rotate around a vertical axis Z, for example in the case illustrated the support 29 rests on a base 41 that can rotate around a vertical axis Z.

Advantageously but not necessarily, each projection 33 of the support 29 has a shape chosen from the group consisting of: a parallelepiped shape (as illustrated in FIGS. 14 and 15), a cylindrical shape, a conical shape, the shape of a truncated cone, a pyramidal shape, the shape of a truncated pyramid.

More specifically, advantageously but not limitedly, the parallelepiped shape is a parallelepiped shape with a convex, polygonal (cross-section) base with at least four angles (in particular, with at least six angles; more in particular, with at least eight angles). According to specific non-limiting embodiments, the parallelepiped shape has a rectangular (cross-section) base. According to other specific non-limiting embodiments, the parallelepiped shape has an octagonal (cross-section) base.

Alternatively or additionally, the cylindrical shape is a cylindrical shape with a substantially circular (cross) section.

Alternatively or additionally, the conical shape is a conical shape with a substantially circular (cross) section.

Alternatively or additionally, the shape of a truncated cone is a shape of a truncated cone with a substantially circular (cross) section.

Alternatively or additionally, the pyramidal shape is a pyramidal shape with a convex, polygonal (cross-section) base with at least four angles (in particular, with at least five angles; more in particular, with at least six angles; still more in particular, with at least eight angles).

According to specific non-limiting embodiments, the pyramidal shape has an octagonal (cross-section) base.

Alternatively or additionally, the shape of a truncated pyramid is a shape of a truncated pyramid with a convex, polygonal (cross-section) base with at least four angles (in particular, with at least five angles; more in particular, with at least six angles; still more in particular, with at least eight angles). According to specific non-limiting embodiments, the shape of a truncated pyramid has an octagonal (in particular, regular) (cross-section) base.

With reference to the shapes of the projections 33, (cross) section means the section perpendicular to the longitudinal extension (from the base portion 32) of the projection 33.

According to some non-limiting embodiments, the majority of the (in particular, all the) projections 33 substantially has (have) the same shape.

Advantageously but not necessarily, the projections 33 have a rounded (substantially round) section or a polygon with more than four angles. This facilitates the insertion of the tines 36 in the recesses 34 reducing, among other things, the risk that the tines 36 block, get stuck and/or damage the projections 33. This type of advantage is more apparent when the projections have a rounded (substantially round) section.

According to some non-limiting embodiments, the projections 33 have a width L of at least approximately 10 mm (at least approximately 16 mm). In particular, the width L is up to (not greater than) approximately 50 mm (more in particular, up to approximately 20 mm). In particular, the projections 33 project from said base portion 32 and have a maximum width from approximately 10 to approximately 50 mm.

Additionally or alternatively, the recesses 34 have a width B of at least approximately 10 mm (at least approximately 13 mm). In particular, the width B is up to (not greater than) approximately 50 mm (more in particular, up to approximately 15 mm).

Additionally or alternatively, the projections 33 have a height H starting from the base portion of at least approximately 12 mm (in particular, at least approximately 20 mm). In particular, the height H is up to (not higher than) approximately 80 mm (more in particular, up to approximately 50 mm).

The dimensions indicated above have experimentally proven to be the most advantageous for ensuring an effective support to the ceramic articles 2 and simultaneously an easy accessibility to the recesses 34 (in particular, for the moving device 30, more in particular for the holding head 35).

According to some non-limiting embodiments such as the one illustrated in FIGS. from 3 to 13, the plurality of ceramic articles 2 of the group G are stacked (according to the first given arrangement) so as to define at least two layers of ceramic articles 2, preferably a plurality of layers of ceramic articles 2, and the moving device 27 is configured to pick up at least one layer (at a time) of ceramic articles 2 of the group G from the support structure 5 and move it from the input station 26 to a splitting-up station 28. In other words, in this case, the aforementioned "at least part of the plurality of ceramic articles 2 of the group G" comprises (in particular, coincides with) a layer of ceramic articles 2.

According to some advantageous but not exclusive embodiments (such as the ones illustrated in FIGS. from 3 to 13), the moving device 27 comprises: a frame 42 which is movable between the input station 26 and the splitting-up station 28; a first clamping element 43, which is connected to the movable frame 42; a second clamping element 44, which is connected to the movable frame 42 and is substantially parallel to and opposite the first clamping element 43; and a moving unit 45, which is configured to move at least one between the first clamping element 43 and the second clamping element 44 and so that by moving close to one another (in particular, in a substantially horizontal direction) they clamp the aforementioned part of said plurality of ceramic articles 2 of the group G of ceramic articles 2 on opposite sides, in particular the aforementioned part of the peripheral edge PB of the group G of ceramic articles 2.

According to some advantageous but not exclusive embodiments such as the ones illustrated, the moving device 27 also comprises a third clamping element 46, which is connected to the movable frame 42 and is orthogonal to the first and to the second clamping elements 43 and 44, and a fourth clamping element 47 which is connected to the movable frame 42 and is parallel to the third clamping element 46 and orthogonal to the first and to the second clamping elements 43 and 44. Such clamping elements 43 and 44, 46 and 47 are configured movable between one another for clamping (in particular for surrounding in contact) each at least part of a respective side, advantageously the totality of a respective outer side LPB of the peripheral edge PB of the aforementioned part of the plurality of ceramic articles 2 which has to be transferred towards the splitting-up station 28.

Specifically, advantageously but not limitedly, the first and the second clamping elements 43 and 44 can slide through the third and the fourth clamping elements 46 and 47 in order to change their mutual distance; alternatively or in combination, the third and the fourth clamping elements 46 and 47 can slide through the first and the second clamping elements 43 and 44 so that when properly operated by the moving unit 45 they clamp in contact at least part of the outer sides LPB of the part of the plurality of ceramic articles 2 of the group G. Advantageously but not limitedly, in fact, in this case the moving unit 45 is configured to also move at least one between the third clamping element 46 and the fourth clamping element 47 so that by moving close to one another (in particular, in substantially horizontal direction) they clamp the at least part of the plurality of ceramic articles 2 of the group G of ceramic articles 2 on opposite sides (and orthogonal to the sides in the area of which such part of the plurality of ceramic articles 2 of the group G of ceramic articles 2 is clamped by the first and by the second clamping elements 43 and 44).

Such shape of the moving device 27 allows picking up the aforementioned part of the aforementioned plurality of ceramic articles 2 in an easy and safe manner, reducing the risk of damaging the ceramic articles 2.

In the advantageous but not exclusive embodiment illustrated in the accompanying figures (see Figures from 3 to 13)

the movable frame 42 can slide along a horizontal guide 48 which extends from the input station 26 to the splitting-up station 28 and the clamping elements 43 and 44 and possibly 46 and 47 are carried movable at least vertically by the frame 42.

Advantageously but not necessarily, the handling machine 6 comprises a support unit 49 arranged at the input station 26 and configured to receive the group G of ceramic articles 2 to be re-arranged (as illustrated in Figures from 3 to 13). Alternatively or in combination, the handling machine 6 comprises a further support unit 50 arranged at the output station 31 and configured to receive the modified group MG of ceramic articles 2.

In the non-limiting embodiment illustrated in Figures from 3 to 13, the support unit 50 comprises a conveyor 51 (with rollers of known type) for transporting the modified group MG of ceramic articles 2 (in particular the storage unit 10) from the output station 31 outwards by the handling machine 6.

According to some embodiments not illustrated, the modified group MG of ceramic articles 2 is formed directly (without interposition of the support structure 8) on the support unit 50, in particular on the conveyor 51, and transferred by means of the conveyor 51 directly to the forming machine 12.

It is understood that also the support unit 49 could comprise a conveyor.

Advantageously but not necessarily, the plant 1 comprises at least one control unit (of type per se known and not illustrated) configured to control (and coordinate) at least the movements of the moving devices 27 and 30, such control unit advantageously but not necessarily coincides with the control unit 23 described above (and/or with the control unit intended to control the operating unit 40). Alternatively, according to variants not illustrated, such control unit could be a further control unit forming part of the handling machine 6 (and possibly configured to also control the operating unit 40, i.e. coinciding with the control unit intended to control the operating unit 40).

Advantageously but not limitedly, when the plurality of ceramic articles 2 of the group G of ceramic articles 2 is connected to the support structure 5, the plant 1 comprises an opening/cutting station 25, arranged immediately upstream of the re-arranging station 7 and in the area of which the storage units 4 are opened manually or by a suitable machine (not illustrated) in order to separate the ceramic articles 2 of the storage unit 4 from the support structure 5, so that they can be re-arranged by the handling machine 6.

In accordance with a further aspect of the present invention, a method for re-arranging ceramic articles 2 of a group G of ceramic articles 2 is provided so as to obtain a modified group MG of ceramic articles 2, advantageously but not necessarily implemented with a handling machine 6 of the type described above.

In particular, the group G of ceramic articles 2 and the modified group MG of ceramic articles 2 are as described above.

In particular, as already expressed with reference to the handling machine 6, the group G of ceramic articles 2 intended to be re-arranged comprises a plurality of ceramic articles 2 and a first support structure 5 on which the ceramic articles 2 are arranged according to the first given arrangement described above, while the modified group MG of ceramic articles 2 obtained with the method of the present invention comprises the aforementioned sub-group SG of ceramic articles 2 and a second support structure 8, on which the sub-group SG of ceramic articles 2 is arranged according to the second given arrangement described above, different from the first given arrangement.

Advantageously, the method comprises: a first holding step, during which a moving device 27 (in particular, of the type described above) gets hold of at least part of the plurality of ceramic articles 2 of the group G; a first transfer step, which is at least partially subsequent to the first holding step, during which the moving device 27 transfers such part of the plurality of ceramic articles 2 towards a splitting-up station 28, which comprises at least one support 29 (i.e. in particular of the type described above) having a base portion 32 and a plurality of projections 33 which project from the base portion 32 so as to define a plurality of recesses 34 each placed between said projections 33.

Advantageously, the method for re-arranging the ceramic articles 2 of a group G of ceramic articles 2 further comprises: a further holding step, during which a further moving device 30 (in particular, of the type described above) which is provided with a holding head 35 (in particular, of the type described above) having at least two tines 36 (in particular, a plurality of tines 36), inserts at least part of such tines 36 into corresponding first recesses 34 of the support 29 and picks up from the support 29 at least one ceramic article 2 (in particular, independently of the others); and a further transfer step, during which the moving device 30 transfers the ceramic article 2 picked up onto the support structure 8 arranged according to the second given arrangement described above so as to form the modified group MG of ceramic articles, as well as the aforementioned storage unit 10.

Specifically, advantageously but not necessarily, the first holding step provides for the moving device 27 to surround in contact at least part of the peripheral edge PB of the part of ceramic articles 2 of the group G so as to clamp (grab) such part and transfer it.

When the ceramic articles 2 of the group G of ceramic articles 2 are stacked so as to define at least two layers of ceramic articles 2 (in particular, a plurality of layers of ceramic articles 2) the aforementioned part of the plurality of ceramic articles 2 picked up by the moving device 27 during the first holding step comprises (in particular, consists of) one of said layers of ceramic articles 2 and the method provides for the various steps, thus the first pick-up step, the first transfer step, and the further pick-up step and transfer step to be repeated for each layer of ceramic articles 2 making up the group G of ceramic articles 2.

It is understood that the steps of the method can be repeated any number of times, upon the varying of the number of layers making up the group G of ceramic articles 2.

Advantageously but not necessarily, the method further comprises a feeding step, during which a group G of ceramic articles 2 (in particular a storage structure 4) is fed, advantageously from the transfer device 19, towards the re-arranging station 7, in particular towards the input station 26. More in particular, advantageously but not necessarily, such feeding step provides for a pick-up sub-step, during which the at least one storage unit 4 is picked up from the gathering area 3 described above, and carried into the re-arranging station 7, in particular at the input station 26.

Advantageously but not necessarily, the method also comprises a first transfer step, during which the modified group MG of ceramic articles 2 (in particular the storage unit 10) is transferred, advantageously by the transfer device 20, from the output station 31 towards the intermediate store 11 (or possibly towards the intermediate store 24), where the storage unit 10 is stored; and a second transfer step, during which at least one ceramic article 2 of the storage unit 10, in particular a given number of ceramic articles 2 of the storage unit 10, is transferred, advantageously but not limitedly by the transfer device 21, from the intermediate store 11 to said forming machine 12. Advantageously but not necessarily, during the second transfer step, the transfer device 21 transfers the storage unit 10 from the intermediate store 11 to the forming machine 12, which picks up at least one ceramic article 2, or a certain number of ceramic articles 2, from the storage unit 10 and carries it, or carries them, on the support structure 13 for forming the shipping unit 14.

Specifically, when the order to be shipped is a mixed order, i.e. when the shipping unit 14 to be created contains ceramic articles 2 of different type, i.e. having different geometrical (shape and/or dimensions) and/or aesthetic and/or functional characteristics, the transfer device 21 and the forming machine 12 are controlled by a control unit 23 (advantageously of the type described above) so as to produce such shipping unit 14 comprising a given number of ceramic articles 2 of first type and a given number of ceramic articles 2a of a second given type, different from the first type (see in particular FIG. 2).

The scope of the present invention has several advantages with respect to the prior art. Among these, we mention the following.

The handling method and machine 6 for re-arranging ceramic articles 2 of a group G of ceramic articles 2 of the present invention allow automizing the forming process of the shipping units 14 which is typically carried out manually, allowing obtaining modified groups MG of ceramic articles 2 in a simple and quick manner simultaneously reducing the risk of damaging the ceramic articles 2, for example during the holding operation.

Furthermore, the handling machine 6 and the method of the invention allow performing in an automatic manner the opening of the storage unit 4, the splitting-up of the group G of ceramic articles 2 making up such storage unit 4 and the following re-arrangement of such ceramic articles 2 in the modified group MG, in which the ceramic articles 2 are arranged in such a way to be accessible (and thus to be picked up) by a holding device 9 with a horizontal hold, with consequent advantages in terms of reduction in the number of operators necessary for carrying out the operations described above, and thus in labour costs, but also in terms of reduction in the risk of accidents inside the plant 1, since there are fewer operators and the operations that said operators have to carry out are less risky, and in terms of increase in the precision with which such operations are carried out.

The invention claimed is:

1. A handling machine to re-arrange ceramic articles of a group (G) of ceramic articles, which comprises a plurality of ceramic articles and a first support structure;

said plurality of ceramic articles is placed on said first support structure, which is placed at an input station, according to a first given arrangement;

the handling machine being configured to re-arrange said ceramic articles so as to obtain a modified group (MG) of ceramic articles, said modified group (MG) of ceramic articles comprising at least one sub-group (SG) of said plurality of ceramic articles and a second support structure, on which said at least one sub-group (SG) of said plurality of ceramic articles is placed according to a second given arrangement, which is different from the first given arrangement; the handling machine comprises:

a first moving device, which is configured to pick up at least part of said plurality of ceramic articles from said first support structure and move said at least part of said plurality of ceramic articles from said input station to a splitting-up station;

a support, which is arranged at said splitting-up station, is configured to support said at least part of said plurality of ceramic articles and comprises a base portion and a plurality of projections, which project from the base portion so as to define a plurality of recesses, each placed between said projections; and a second moving device, which is configured to transfer said at least one sub-group (SG), which is at least a portion of said at least part of the plurality of ceramic articles, from the splitting-up station to an output station and to place said at least one sub-group (SG) on said second support structure, which is placed at the output station, according to said second given arrangement, so as to obtain said modified group (MG) of ceramic articles;

said second moving device comprises a holding head, said holding head comprising at least two tines, and is configured to insert at least part of said tines into corresponding first recesses of said support so as to pick up, from said support, at least one ceramic article of said at least part of said plurality of ceramic articles.

2. The handling machine according to claim 1, wherein: said at least part of said plurality of ceramic articles of the group (G) of ceramic articles has a peripheral edge (PB), and said first moving device is configured to surround in contact at least part of said peripheral edge (PB) so as to hold said at least part of said plurality of ceramic articles.

3. The handling machine according to claim 2, wherein said first moving device comprises:

a frame, which is movable between said input station and said splitting-up station;

a first clamping element, which is connected to the movable frame;

a second clamping element, which is connected to the movable frame and is substantially parallel to and opposite the first clamping element; and a moving unit, which is configured to move at least one between the first clamping element and the second clamping element so that the first clamping element and the second clamping element, by moving close to one another (in particular, in a substantially horizontal direction), clamp said at least part of the group (G) of said plurality of ceramic articles of the group (G) of ceramic articles on opposite sides.

4. The handling machine according to claim 3, wherein the first moving device comprises:

a third clamping element, which is connected to the movable frame and is orthogonal to said first clamping element and second clamping element; and a fourth clamping element, which is connected to the movable frame and is parallel to the third clamping element as well as orthogonal to said first clamping element and second clamping element;

wherein said first clamping element, second clamping element, third clamping element and fourth clamping element are configured to each clamp at least part of a respective outer side (LPB) of said peripheral edge (PB) of said at least part of said plurality of ceramic articles, so as to hold and pick up said at least part of the group (G) of said plurality of ceramic articles of the group (G) of ceramic articles;

wherein said moving unit is configured to move at least one between the third clamping element and the fourth clamping element so that the third clamping element and the fourth clamping element, by moving close to one another (in particular, in a substantially horizontal direction), clamp said at least part of the group (G) of said plurality of ceramic articles of the group (G) of ceramic articles on opposite sides.

5. The handling machine according to claim 4, wherein:

said first clamping element and second clamping element can slide through said third clamping element and through the fourth clamping element in order to change their mutual distance; and said third clamping element and fourth clamping element can slide through said first clamping element and through the second clamping element in order to change their mutual distance.

6. The handling machine according to claim 1, wherein said second moving device comprises a moving assembly, which carries said holding head and is configured to move said holding head at least between said splitting-up station and said output station.

7. The handling machine according to claim 6, wherein: said holding head can rotate relative to said moving assembly; in particular, the moving assembly comprises a robotic arm, on which said holding head is mounted.

8. The handling machine according to claim 1, wherein said holding head comprises an opposing element opposite said tines and is configured to clamp at least one ceramic article between said tines and said opposing element.

9. The handling machine according to claim 8, wherein said opposing element and said tines define a jaw with a horizontal hold.

10. The handling machine according to claim 1, wherein:

each projection has a shape chosen from the group (G) consisting of: a parallelepiped shape, a cylindrical shape, a conical shape, the shape of a truncated cone, a pyramidal shape, and the shape of a truncated pyramid;

wherein:

the parallelepiped shape is a parallelepiped shape with a convex, polygonal base with at least four angles (in particular, the parallelepiped shape is a rectangular parallelepiped shape);

the cylindrical shape is a cylindrical shape with a substantially circular cross section;

the conical shape is a conical shape with a substantially circular cross section;

the shape of a truncated cone is a shape of a truncated cone with a substantially circular cross section;

the pyramidal shape is a pyramidal shape with a convex, polygonal base with at least five angles; and the shape of a truncated pyramid is a shape of a truncated pyramid with a convex, polygonal base with at least five angles.

11. The handling machine according to claim 1, wherein the support is rotatable around a vertical axis (Z).

12. A method to re-arrange ceramic articles of a group (G) of ceramic articles, said group (G) comprising a plurality of ceramic articles and a first support structure, so as to obtain a modified group (MG) of ceramic articles;

said plurality of ceramic articles is placed on said first support structure with a first given arrangement at an input station;

said modified group (MG) of ceramic articles comprises at least one sub-group (SG) of said plurality of ceramic articles and a second support structure, on which said at least one sub-group (SG) of said plurality of ceramic articles has a second given arrangement, which is different from the first given arrangement; the method comprises:

a first holding step, during which a first moving device gets hold of at least part of said plurality of ceramic articles;

a first transfer step, which is at least partially subsequent to said first holding step and during which said first moving device transfers said at least part of said plurality of ceramic articles towards a splitting-up station, which comprises at least one support comprising a base portion and a plurality of projections, which project from the base portion so as to define a plurality of recesses, each placed between said projections;

a second holding step, during which a second moving device, which is provided with a holding head, said holding head comprising at least two tines, inserts at least part of said tines into corresponding first recesses of said support and picks up, from said support, at least one ceramic article of said at least part of said plurality of ceramic articles; and a second transfer step, during which said second moving device transfers said at least one ceramic article onto the second support structure according to said second given arrangement.

13. The method according to claim 12, wherein said at least part of said plurality of ceramic articles of the group (G) of ceramic articles comprises a peripheral edge (PB) and said first holding step entails said first moving device surrounding—in contact—at least part of said peripheral edge (PB) so as to clamp said at least part of said plurality of ceramic articles.

14. The method according to claim 12, wherein the ceramic articles of the group (G) of ceramic articles are stacked so as to define at least two layers of ceramic articles; said at least part of said plurality of ceramic articles picked up by said first moving device during the first holding step comprises (in particular, consists of) one of said layers of ceramic articles; in particular, the method entails said first pick-up step, first transfer step, second pick-up step and second transfer step being repeated for each layer of ceramic articles making up said group (G) of ceramic articles.

15. The method according to claim 12, wherein the ceramic articles are arranged in the group (G) in such a way that at least a side portion of the peripheral edge (PB) of a ceramic article is covered by one or more ceramic articles of the group (G).

16. The method according to claim 12, wherein: the ceramic articles of said plurality of ceramic articles of the group (G), which have said first given arrangement, are arranged vertically (in particular, edgeways); and the ceramic articles of said modified group (MG) of ceramic articles, which have said second given arrangement, are arranged horizontally on said support structure.

17. The method according to claim 12, and carried out with a handling machine comprising:

a first moving device, which is configured to pick up at least part of said plurality of ceramic articles from said first support structure and move said at least part of said plurality of ceramic articles from said input station to a splitting-up station;

a support, which is arranged at said splitting-up station, is configured to support said at least part of said plurality of ceramic articles and comprises a base portion and a plurality of projections, which project from the base portion so as to define a plurality of recesses, each placed between said projections; and a second moving device, which is configured to transfer said at least one sub-group (SG), which is at least a portion of said at least part of the plurality of ceramic articles, from the splitting-up station to an output station and to place said at least one sub-group (SG) on said second support structure, which is placed at the output station, according to said second given arrangement, so as to obtain said modified group (MG) of ceramic articles;

said second moving device comprises a holding head, said holding head comprising at least two tines, and is configured to insert at least part of said tines into corresponding first recesses of said support so as to pick up, from said support, at least one ceramic article of said at least part of said plurality of ceramic articles.

* * * * *